United States Patent
Chan et al.

(10) Patent No.: US 8,386,710 B2
(45) Date of Patent: Feb. 26, 2013

(54) SYSTEM FOR HANDLING INPUT/OUTPUT REQUESTS BETWEEN STORAGE ARRAYS WITH DIFFERENT PERFORMANCE CAPABILITIES

(75) Inventors: Bernard Heng Po Chan, Wichita, KS (US); Mahmoud K. Jibbe, Wichita, KS (US)

(73) Assignee: Netapp, Inc., Sunnyvale, CA (US)

( * ) Notice: Subject to any disclaimer, the term of this patent is extended or adjusted under 35 U.S.C. 154(b) by 0 days.

(21) Appl. No.: 13/418,144

(22) Filed: Mar. 12, 2012

(65) Prior Publication Data
US 2012/0173815 A1 Jul. 5, 2012

Related U.S. Application Data

(63) Continuation of application No. 12/395,786, filed on Mar. 2, 2009, now Pat. No. 8,151,050.

(51) Int. Cl.
*G06F 12/00* (2006.01)

(52) U.S. Cl. .................................. 711/114; 711/165
(58) Field of Classification Search .................. None
See application file for complete search history.

(56) References Cited

U.S. PATENT DOCUMENTS

| 7,363,399 | B2 | 4/2008 | Shum et al. |
| 7,936,672 | B2 | 5/2011 | Skerritt |
| 2007/0043854 | A1 * | 2/2007 | Shum et al. ............... 709/224 |

* cited by examiner

*Primary Examiner* — Shawn X Gu
(74) *Attorney, Agent, or Firm* — Haynes and Boone, LLP

(57) ABSTRACT

An apparatus comprising a remote storage array, a primary storage array and a network. The remote storage array may be configured to (i) define a queue size based on a performance capability of the remote storage array, (ii) generate a multiplier based on resources being used by the remote storage array, and (iii) adjust the queue size by the multiplier. The primary storage array may be configured to execute input/output (IO) requests between the remote storage array and the primary storage array based on the adjusted queue size. The network may be configured to connect the remote storage array to the primary storage array.

20 Claims, 6 Drawing Sheets

SYSTEM FOR HANDLING INPUT/OUTPUT REQUESTS BETWEEN STORAGE ARRAYS WITH DIFFERENT PERFORMANCE CAPABILITIES

CROSS REFERENCE

This application is a Continuation of U.S. Ser. No. 12/395,786 filed Mar. 2, 2009, now U.S. Pat. No. 8,151,050 issued on Apr. 3, 2012 and entitled, "System for Handling Input/Output Requests Between Storage Arrays With Different Performance Capabilities," the entire disclosure of which is incorporated herein by reference in its entirety.

FIELD OF THE INVENTION

The present invention relates to storage arrays generally and, more particularly, to a method and/or apparatus for handling input/output requests between storage arrays with different performance capabilities.

BACKGROUND OF THE INVENTION

Conventional RAID storage devices commonly function as either a target device or as an initiator, or primary device. Remote Volume Mirroring (RVM) is one example where the RAID storage array is used as an initiator. RVM is a feature used in the field to protect information stored on the storage array using real-time data replication to an off-site storage system. RVM can support both synchronous and asynchronous data transfers. Synchronous mirroring provides continuous mirroring between primary and remote volumes to ensure absolute synchronization. A write command being sent by the initiator will only get the status when the write has successfully written on both the primary and remote storage array. Asynchronous mirroring updates data between a primary device and a target device and is updated at periodic intervals.

Another example where a RAID storage array can be used as an initiator is where multiple RAID storage arrays are clustered together. Each storage array in such a configuration receives an input/output (IO) request and automatically forwards the IO request to the appropriate storage array which owns the volume.

Three scenarios commonly occur when using a clustered configuration. First, in the event that a user uses a slower performing remote storage array, the IO requests can be held up on the primary storage array for several minutes until the remote storage array successfully processes the IO requests. Second, in the event that one storage array reboots, the IO requests will stall at the primary storage array. The initiators talking to the primary storage array are not informed of the remote storage array rebooting. The initiators will continue to send IO requests during the reboot. Third, in the event that a user starts an event on the remote storage array which causes the array to perform slower, the IO requests will stall at the primary storage array until the event finishes.

Depending on the particular operating system used, and the different IO drivers, the initiator allows a command timeout of between 30 and 300 seconds. A typical timeout value is 60 seconds. When an IO request times out, the initiator will have to perform an appropriate clean up operation. A clean up operation involves aborting the IO request, then retrying the aborted IO request. Since the IO request is already queued in the storage array RAID engine, the aborted IO request is marked aborted, but will wait in the queue to get processed. When the initiator retries the IO request, the retrieved IO request will have to wait again on the storage array. Over time, the situation gets worse and the storage array will eventually come to a halt. When this happens, the application running on the initiator will encounter an IO error due to the IO timing out.

There are several factors affecting the performance of a storage array. Some of these factors include (i) the total number of volumes implemented, (ii) the amount and type of IO requests being sent, (iii) the type of drives (e.g., SAS, SATA, FC, solid state, etc.), (iv) the storage array controller cache size, (v) the host and drive channel speed, and/or (vi) the background activities (e.g., data scrubbing, dynamic segment sizing, volume copy, etc.)

Existing solutions to such problems include (i) increasing the command timeout at the initiator IO driver and application, (ii) making sure that the primary and remote storage arrays have the same performance capabilities and have the same configuration, and/or (iii) reducing the queue depth on the initiator.

There are several disadvantages to the existing solutions. For example, most host applications will not be able to tolerate a higher command timeout. Command timeouts are not tunable for some applications and/or IO drivers. Existing solutions do not provide a flexible storage solution to the end user if there is a requirement that both the primary and the remote storage arrays are of the same performance capabilities and configuration.

Furthermore, there are several disadvantages of reducing the queue depth on the initiator. For example, for storage array vendors to recommend a queue depth to the end user is almost impossible because there are so many factors contributing to the inter-array performance issue. There is no one number to provide to the user. Even assuming that there is a number, when a user decides to add an additional initiator to the storage array network (SAN), the user will have to re-tune the queue depth on every initiator to accommodate for the new addition.

It would be desirable to implement a system for handling input/output requests between storage arrays with different performance capabilities.

SUMMARY OF THE INVENTION

The present invention concerns an apparatus comprising a remote storage array, a primary storage array and a network. The remote storage array may be configured to (i) define a queue size based on a performance capability of the remote storage array, (ii) generate a multiplier based on resources being used by the remote storage array, and (iii) adjust the queue size by the multiplier. The primary storage array may be configured to execute input/output (IO) requests between the remote storage array and the primary storage array based on the adjusted queue size. The network may be configured to connect the remote storage array to the primary storage array.

The objects, features and advantages of the present invention include providing a system for handling IO requests and/or operations between arrays with different performance capabilities that may (i) resolve the issue of an initiator experiencing an IO error due to command timing out caused by the inter-array pipe being clogged when the remote storage array (a) is less capable (e.g., performance wise) than the primary storage array, (b) experiences a short down time, and (c) declines in performance capability due to new events taking place, (ii) be transparent to the user, (iii) be implemented without user intervention, (iv) be implemented without parameter changes at the initiator, (v) resolve the architecture issue while running a maximum IO workload and processing errors at the same time in storage array products configured with (a) maximum host logins (e.g., maximum initiators), (b) maximum user volumes (e.g., <=2048 volumes), (c) bidirectional synchronous mirroring, (d) maximum snapshots, (e) maximum copy volumes, (f) data scrubbing, and/or (g) reconfigurations (e.g., DRM, DSS, DCE, etc.), and/or (vi) resolve issues relating to port bounce tests.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
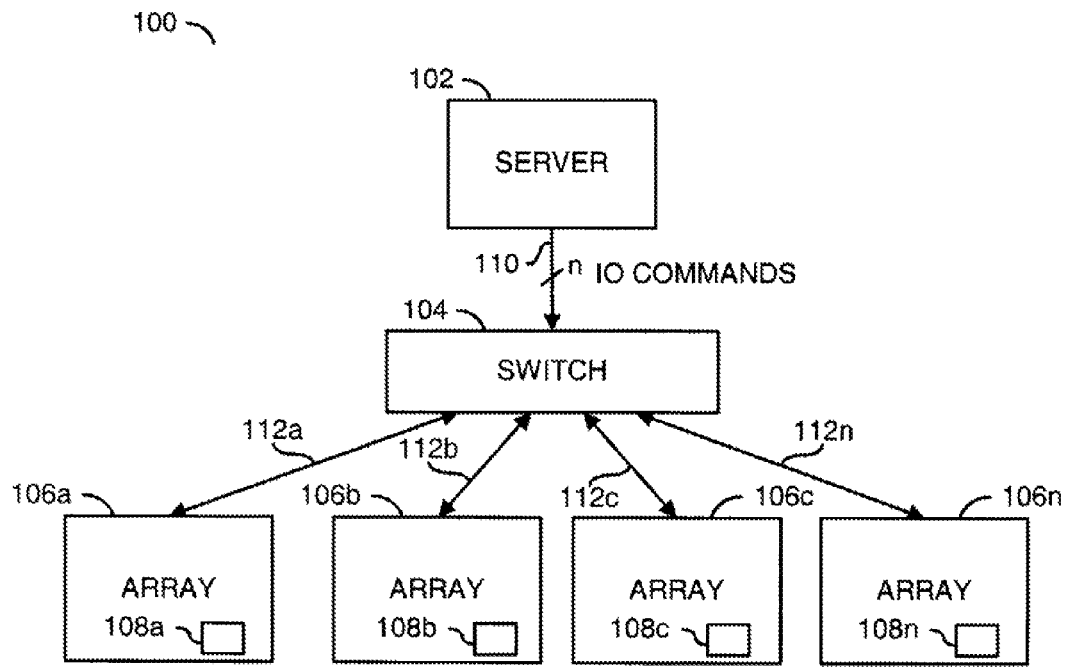
FIG. 1 is a block diagram of an embodiment of the present invention.

Referring to FIG. 1, a block diagram of the system 100 is shown in accordance with a preferred embodiment of the present invention. The system 100 generally comprises a module 102, a module 104, a set of modules 106a-106n, and a set of modules 108a-108n. The module 102 may be implemented as a server. The module 104 may be implemented as a switch. The modules 106a-106n may be implemented as storage arrays. In one example, the module 106a may be implemented as a primary storage array. The modules 106b-106n may be implemented as one or more remote storage arrays. The modules 108a-108n may be implemented as IO queues. The server 102 may be connected to the switch 104 through a connection 110. The switch 104 may be connected to the arrays 106a-106n through a number of connections 112a-112n. The particular number of arrays 106a-106n may be varied (e.g., increased and/or decreased) to meet the design criteria of a particular implementation. The connection 110 and/or the connections 112a-112n may be network connections, such as a fiber channel connection or other type of network connection. The connection 110 and/or the connections 112a-112n may each be implemented as one or more network segments.

Figure 1B:
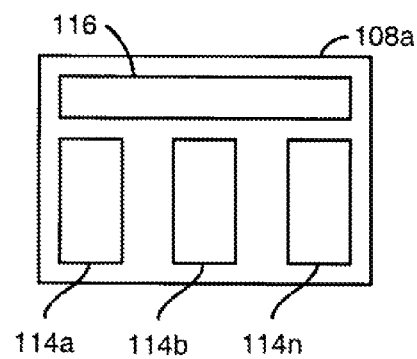
FIG. 1B is a block diagram showing the details of the IO queue.

Referring to FIG. 1B, a more detailed diagram of one of the IO queues 108a-108n (e.g., 108a) is shown. The IO queue 108a may be implemented as a number of sub-queues 114a-114n and an inter-array IO flood gate 116. Each of the sub-queues 114a-114n may correspond to one or more of the arrays 106a-106n. The sub-queues 114a-114n may represent inter-array IO queues. For example, the sub-queue 114a may correspond to the remote storage array 106a, the sub-queue 114b may correspond to the remote storage array 106b, etc. Each of the sub-queues 114a-114n may be varied in size to meet the design criteria of a particular implementation. In one example, each of the sub-queues 114a-114n may be implemented as a memory space allocated from a pooled amount of memory. In one example, the IO queues 108a-108n may be implemented as a memory, such as an NVSRAM memory. However, other types of memories may be implemented to meet the design criteria of a particular implementation. The queues 108a-108n may be implemented along with the arrays 106a-106n, or as a discrete plug-in device to the arrays 106a-106n. The server 102 may send a plurality of IO requests (or IO commands) to the switch 104. The switch 104 may translate (or send) the IO requests to one or more of the arrays 106a-106n.

Figure 2:
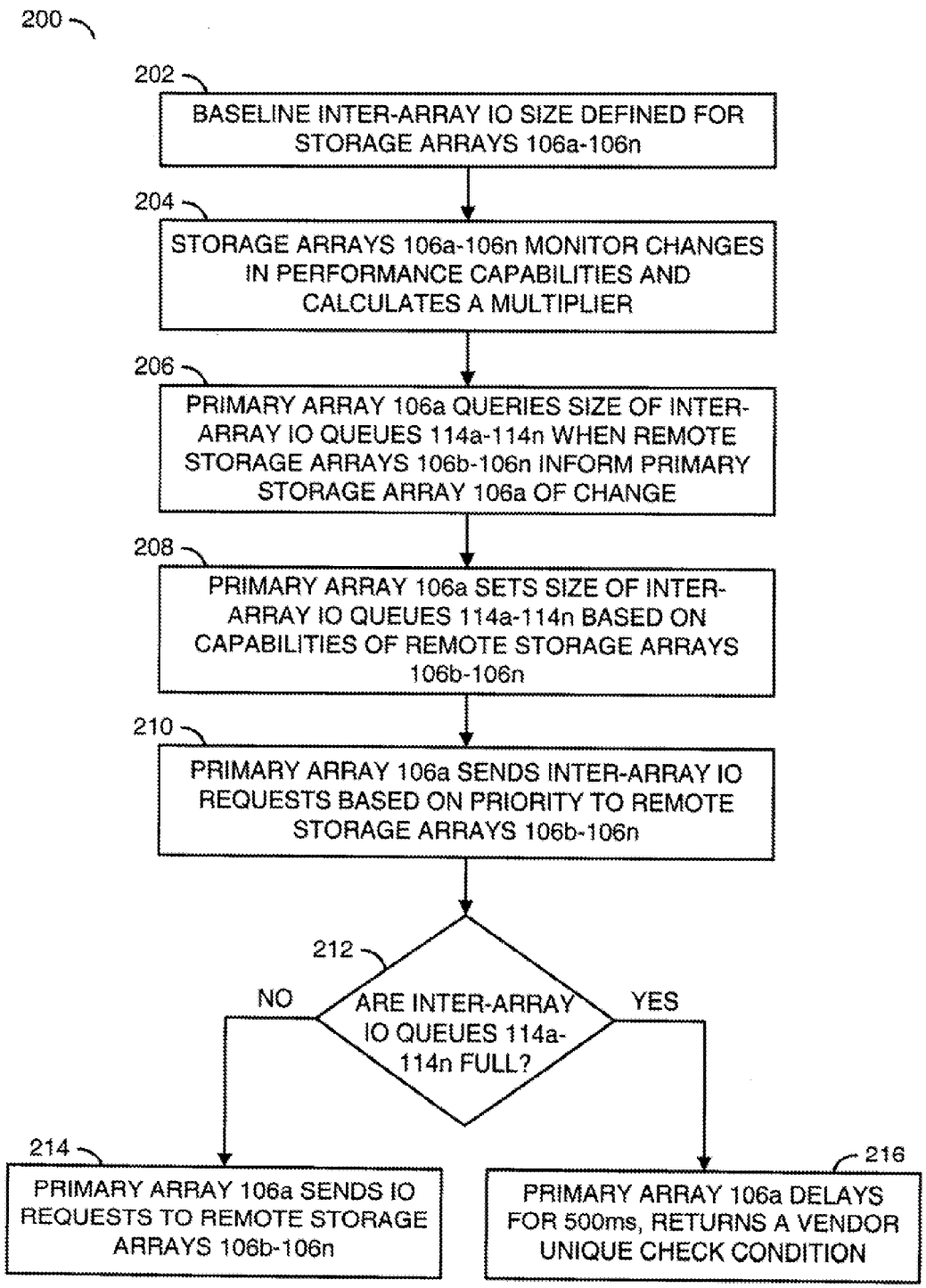
FIG. 2 is a flow diagram illustrating an embodiment of the present invention.

Referring to FIG. 2, a flow diagram illustrating a process (or method) 200 is shown. The process 200 generally comprises a state 202, a state 204, a state 206, a state 208, a state 210, a decision state 212, a state 214, and a state 216. In the state 202, an inter-array IO queue size (e.g., a baseline size) may be defined for a plurality of storage arrays (e.g., the storage arrays 106a-106n). In the state 204, the storage arrays 106a-106n may monitor for performance capability changes.

The process 200 may use the state 204 to calculate an inter-array IO queue size multiplier for one or more of the storage arrays 106a-106n. In the state 206, the primary storage array 106a may query the inter-array IO queue size of the remote storage arrays 106b-106n. When there is a change in the multiplier, the remote storage arrays 106b-106n may inform the primary storage array 106a of the change. The change may be communicated to the primary storage array 106a through one or more of the connections 112a-112n. In the state 208, the primary storage array 106a may set the inter-array IO queue size (e.g., the size of the sub-queues 114a-114n) based on the capabilities of the remote storage arrays 106b-106n. In the state 210, the primary storage array 106a may send the inter-array IO requests to the remote storage arrays 106b-106n. In one example, inter-array IO requests with a higher priority than non-inter-array IO requests may be sent. In the decision step 212, the process 200 may determine if the inter-array IO queues 114a-114n are full. If not, the process 200 may use the step 214 to send the IO requests to the remote storage arrays 106b-106n. If so, the primary storage array 106a may implement a slight delay (e.g., in the range of 250 ms-500 ms, although other delays may be implemented). The primary storage array 106a may then return a vendor unique check condition in response to new commands by implementing an inter-array IO exchange.

The system 100 may negotiate the capability of each of the storage arrays 106a-106n prior to processing the IO requests (e.g., "up front"), based on information exchanged. The inter-array IO flood gate 116 (e.g., within the primary storage array 106a) may set a higher priority for IO requests initiated by a particular one of the remote storage arrays 106b-106n. When the performance capability of a particular one of the remote storage arrays 106b-106n (e.g., the remote storage array 106b) changes (e.g., in response to a change in the multiplier), the primary storage array 106a may be informed of the change by the remote storage array 106b. The primary storage array 106a may then query the remote storage array 106b for the new capability.

The system 100 may operate in a multi-step approach. In a first step, the process 200 may determine the size of the inter-array IO sub-queues 114a-114n. On each of the storage arrays 106a-106n, the process 200 may define a queue size for an inter-array baseline IO queue. The size of the baseline IO queue may be a size that the storage arrays 106a-106n uses to keep up when the system 100 is in an optimal performance state. Since each of the storage arrays 106a-106n may have a different performance level, the size of the baseline IO queue for each of the storage arrays 106a-106n may be set accordingly based on the type of storage array. Based on the different factors affecting the storage arrays 106a-106n performance, the system 100 may calculate a multiplier to be used on the baseline IO queue size. For example, if the system 100 has a data scrubbing process running, the multiplier may end up being calculated as 0.85 if analysis shows that data scrubbing may have a 15% impact on performance of the storage arrays 106a-106n. In general, the multiplier responds to how much of the total IO processing capability is remaining after factoring in the various processes that may be running. When the multiplier is multiplied by the size of the baseline IO queue, the size of the inter-array IO queue may be reduced. When the data scrubbing process completes, the multiplier may be set back to 1.00. In one example, the data scrubbing process may include a command that resets the multiplier.

In a second step, the process 200 may set the size of the inter-array IO queues 114a-114n. When an inter-array communication (e.g., a communication between the primary storage array 106a and one or more of the remote storage arrays 106b-106n) is established, the primary storage array 106a may query the inter-array queue size of a particular one of the remote storage arrays 106b-106n (e.g., the remote storage array 106b). When a change occurs in a performance capability of the remote storage array 106b, a notification of such a change may be sent to the primary storage array 106a. Such a notification may be sent through the connection 112a. The primary storage array 106a may then query the remote storage array 106b for the new size of the IO queue 108b. The primary storage array 106a may then use the new size of the IO queue 108b for inter-array IO request exchanges.

In a third step, the process 200 may execute based on the size of one or more of the inter-array IO queues 114a-114n. When the primary storage array 106a needs to send an inter-array IO request, the primary storage array 106a may check the size of the inter-array IO queues 114a-114n. When a particular one of the inter-array IO queues 114a-114n is full, the flood gate 116 may close until the particular one of the inter-array IO queues 114a-114n is no longer full. When the flood gate 116 is closed, the primary storage array 106a may delay the incoming IO requests for a brief moment (e.g., 250 ms-500 ms, although other delays may be implemented) before returning a busy signal. The busy signal may be implemented, in one example, as a vendor unique check condition. When the primary storage array 106a sees such a condition, the IO request may be re-sent.

In addition to the size of the inter-array IO queue, the IO requests may also be prioritized. inter-array IO requests may normally have a higher priority than a normal IO request received from the server 102. With such a priority configuration, the inter-array IO requests will normally be processed first.

The following example illustrates a typical operation of the system 100. A user may configure a primary storage array (e.g., the storage array 106a) (e.g., an LSI 7091 array, but other arrays may be implemented) as a primary RVM storage array. A remote storage array (e.g., the storage array 106b) (e.g., an LSI 3994, but other arrays may be implemented) may be configured as a remote RVM storage array. In this case, the primary storage array 106a normally performs faster than the remote storage array 106b. In such an example, the baseline queue size (e.g., the queue depth) of the primary storage array 106a may be set to 512 (e.g., 512 IO requests may be outstanding). A baseline queue size of the remote storage array 106b may be set to 256 (e.g., 256 IO requests may be outstanding).

In a typical operation, a number of background processes may be implemented on the remote storage array 106b. For example, a data scrubbing process may be running on the remote storage array 106b. In such an implementation, a multiplier factor (e.g., 0.85) may be used to reduce the size of the baseline IO queue (e.g., 108b) of the remote storage array 106b. Therefore, the size of the inter-array queue 114b may be set to 217 (256*0.85). Each time an inter-array communication is established, the primary storage array 106a may query the remote storage array 106b for the size of the inter-array IO queue 114b. In the example illustrated, the size of the inter-array IO queue 114b of the remote storage array 106b may be smaller than the size of the inter-array IO queue 114a of the primary storage array 106a. The primary storage array 106a may set the size of the inter-array IO queue 114a to match the size of the inter-array IO queue 114b (e.g., 217) of the remote storage array 106b.

If the inter-array IO queue 114b is full, the primary storage array 106a may delay sending IO requests for a brief amount of time (e.g., 250 ms-500 ms, although other delays may be implemented) before returning the IO requests back to the initiator with a vendor unique check condition. Such a delay may be implemented to allow the inter-array pipeline to clear. In one example (e.g., 30 minutes later), the remote storage array 106b may complete the data scrubbing process. In such an example, the multiplier factor may be changed to 1.00 and the size of the inter-array IO queue 114b may be set to 256 (256*1.00). When this happens, the remote storage array 106b may inform the primary storage array 106a of the changed capability. The primary storage array 106a may query the remote storage array 106b for the new size of the inter-array IO queue 114b. While this example has been illustrated in the context of a primary storage array 106a and a remote array 106b, the process may be duplicated for each of the storage arrays 106a-106n. For example, each of the storage arrays 106a-106n may run a variety of background processes independently. In such a case, the multiplier factor assigned to each of the storage arrays 106a-106n may be independently varied. Furthermore, a combination of the performance factors of each of the storage arrays 106a-106n may be used in combination to determine the total output available by the arrays 106a-106n. For example, if the remote storage array 106b is running a background process, a certain amount of bandwidth may be drawn from the primary storage array 106a. The multiplier factors of each of the arrays 106a-106n may be adjusted to compensate for this reduced bandwidth.

Figure 3:
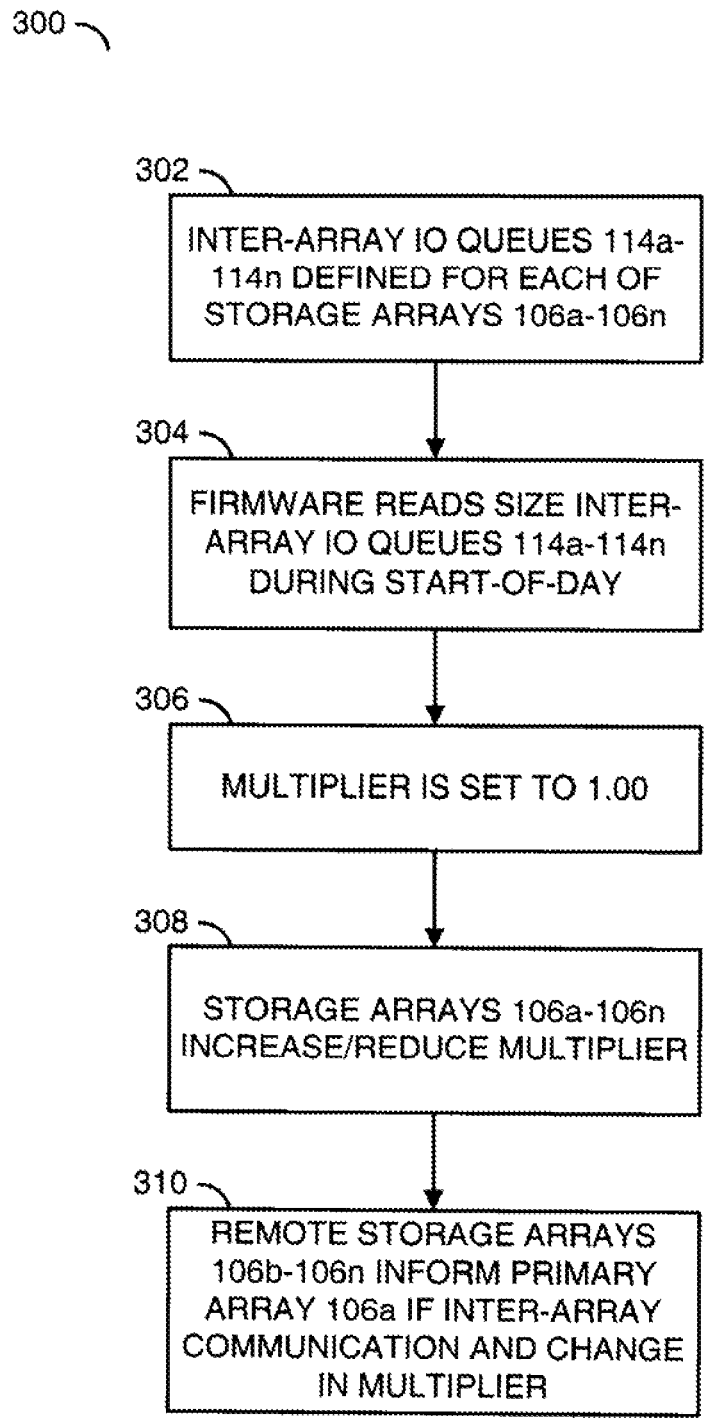
FIG. 3 is a more detailed flow diagram illustrating an embodiment of the present invention.

Referring to FIG. 3, a flow diagram illustrating a process (or method) 300 is shown. The process 300 generally comprises a state 302, a state 304, a state 306, a state 308, and a state 310. In the step 302, the size of the inter-array IO queues 114a-114n may be defined for a plurality of storage arrays 106a-106n in a storage device (e.g., a NVSRAM). In the step 304, firmware stored on the primary storage array 106a may read from the storage device and store in memory during a start-of-day (SOD) procedure. In the step 306, the multiplier may be initially set at 1.00. In the step 308, the multiplier may be increased (or decreased) accordingly. In one example, the multiplier may be increased (or decreased) based on events taking place that impact a performance capability of the storage arrays 106a-106n. In the step 310, the primary storage array 106a may be informed if there is an inter-array communication established. The primary storage array 106a may be informed when there is a change in the multiplier.

The process 300 illustrates the complete process on how the process 200 initializes the size of the inter-array IO queues 114a-114n of the primary storage array 106a. The first step of determining the size of the inter-array IO queues 114a-114n. The size of the baseline inter-array IO queues 114a-114n may be defined in the NVSRAM. During the primary storage array 106a Start-of-Day (SOD), the firmware may read from the NVSRAM and store the size of the inter-array IO queues 114a-114n in a memory. The initial multiplier value may be set at 1.00. When an event takes place which may reduce the performance of the remote storage arrays 106b-106n in processing IO requests, the multiplier may be reduced. When the event completes, the amount deducted previously may be added back to the multiplier.

Figure 4:
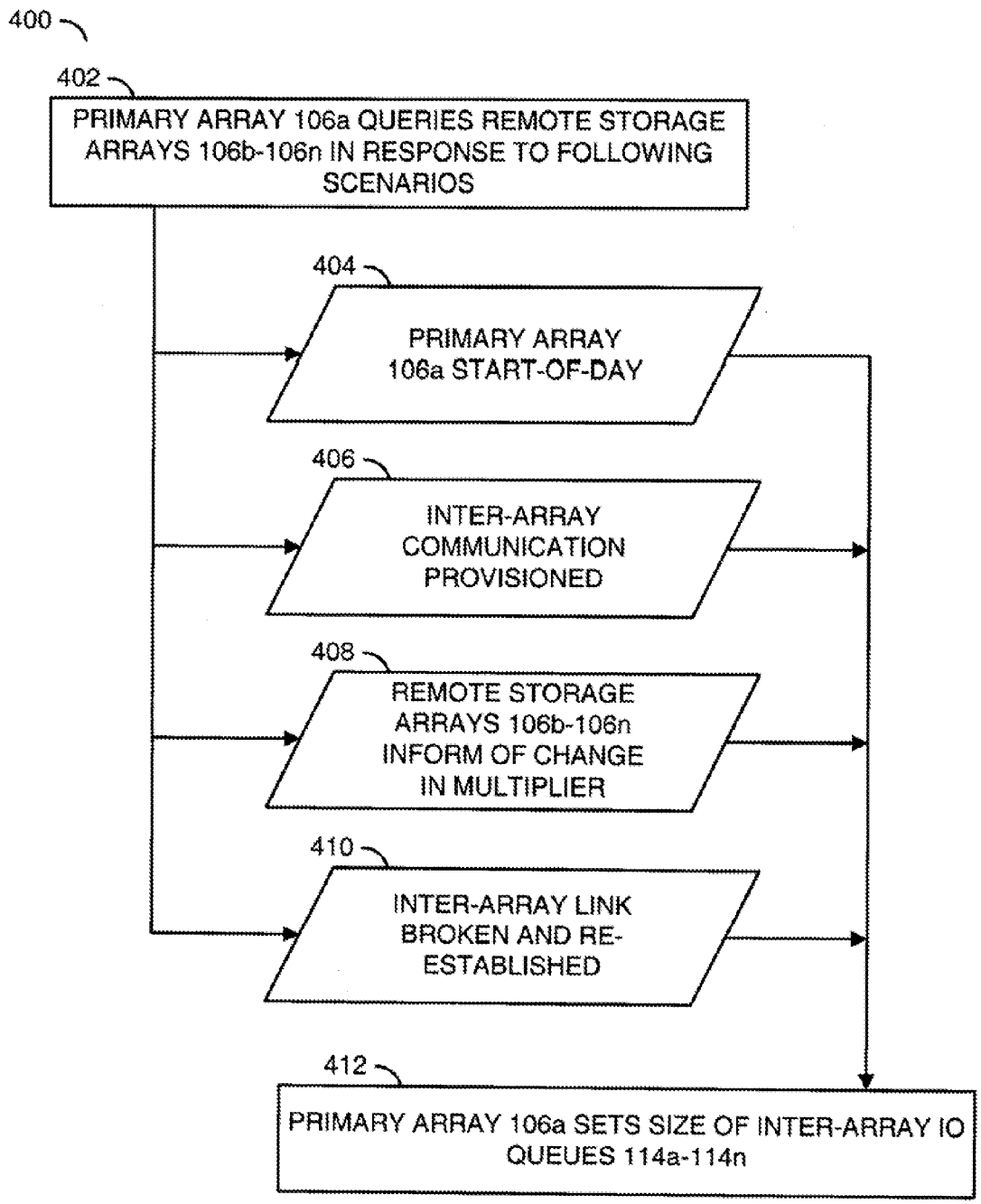
FIG. 4 is a more detailed flow diagram illustrating an embodiment of the present invention.

Referring to FIG. 4, a flow diagram of the process 400 is shown. The process (or method) 400 generally comprises a state 402, a state 404, a state 406, a state 408, a state 410 and a state 412. In the state 402, the primary storage array 106a may query the remote storage arrays 106b-106n for the sizes of the inter-array IO queues 114a-114n in response to the following steps (e.g., the steps 404, 406, 408 and 410). In the step 404, the primary storage array 106a start-of-day (SOD) if there is a need for an inter-array communication. In the step 406, the inter-array communication may be provisioned. In the step 408, the inter-array communication may be broken and re-established. In the step 410, the remote storage arrays 106b-106n may inform the primary storage array 106a of a change in the multiplier. In the step 412, the primary storage array 106a may set the size of the inter-array IO queues 114a-114n.

The process 400 may illustrate the complete process on how the process 200 sets the size of the inter-array IO queues 114a-114n on the primary storage array 106a. The second step of setting the size of the inter-array IO queues 114a-114n of the primary storage array 106a. The primary storage array 106a may query the remote storage arrays 106b-106n for the sizes of the baseline inter-array IO queues 108b-108n of the remote storage arrays 106a-106n in four scenarios. First, during the start-of-day (e.g., SOD) of the primary controller 106a if there is a need for an inter-array communication. Second, while the inter-array communication may be provisioned. Third, when the inter-array communication may be broken and re-established. Fourth, when the remote storage arrays 106b-106n may inform the primary storage array 106a of a change in the multiplier. The primary storage array 106a may set the size of the inter-array IO queues 114a-114n if one of the above four scenarios may occur.

Figure 5:
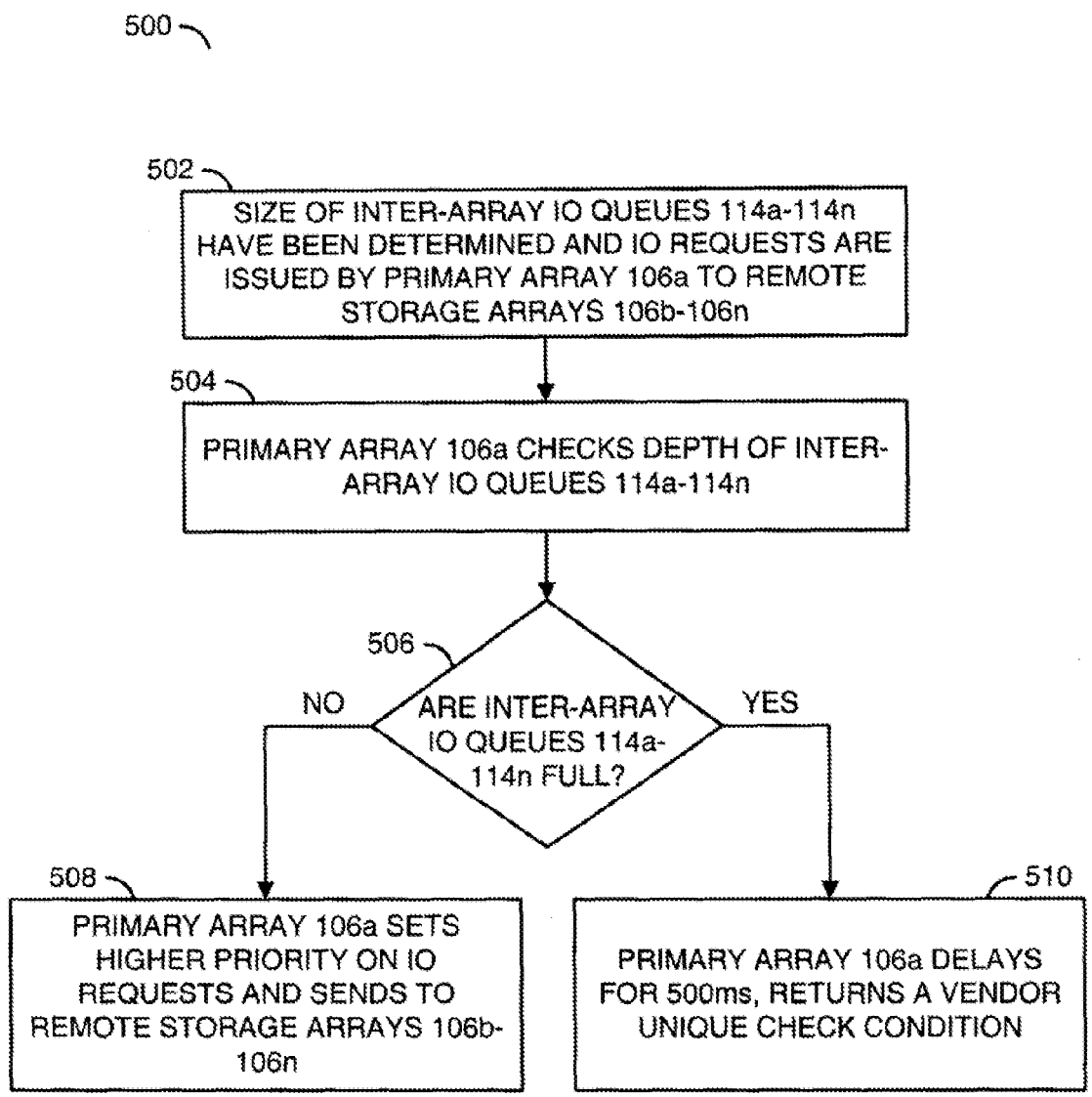
FIG. 5 is a more detailed flow diagram illustrating an embodiment of the present invention.

Referring to FIG. 5, a flow diagram of the process 500 is shown. The process (or method) 500 generally comprises a state 502, a state 504, a decision state 506, a state 508, and a state 510. In the state 502, the size of the inter-array IO queues 114a-114n may have been determined and the IO requests may be issued by the primary storage array 106a to a set of volumes which have been sent to the remote storage arrays 106b-106n. In the step 504, the primary storage array 106a may check the depth of the inter-array IO queues 114a-114n. In the decision step 506, the process 500 may determine if the inter-array IO queues 114a-114n are full. If so, the primary storage array 104 may delay for a brief amount of time and return a vendor unique check condition to any new commands requiring an inter-array IO request exchange in the step 510. If not, the primary storage array 104 may set a higher priority on the IO requests and send the IO requests to the remote storage arrays 106b-106n in the step 508.

The process 500 may illustrate the complete process on how the process 200 is used when the primary storage array 106a may issue IO requests to the remote storage arrays 106b-106n. In the third step executing based on the size of the inter-array IO queues 114a-114n. At the end of step 2, the primary storage array 106a may have already determined the size of the inter-array IO queues 114a-114n to use. The primary storage array 106a may start issuing IO requests to the volumes on the remote storage arrays 106b-106n. The primary storage array 106a may first check the depth of the inter-array IO queues 114a-114n. If the inter-array IO queues 114a-114n are not full, the IO request may be sent to the remote storage arrays 106b-106n. If the inter-array IO queues 114a-114n are full, the primary storage array 106a may delay for a brief period of time (eg. 250 ms-500 ms, although other delays may be implemented) before returning the IO requests as a vendor unique check condition. The inter-array IO requests may also be tagged with a higher priority tag to ensure they are processed first.

Figure 6:
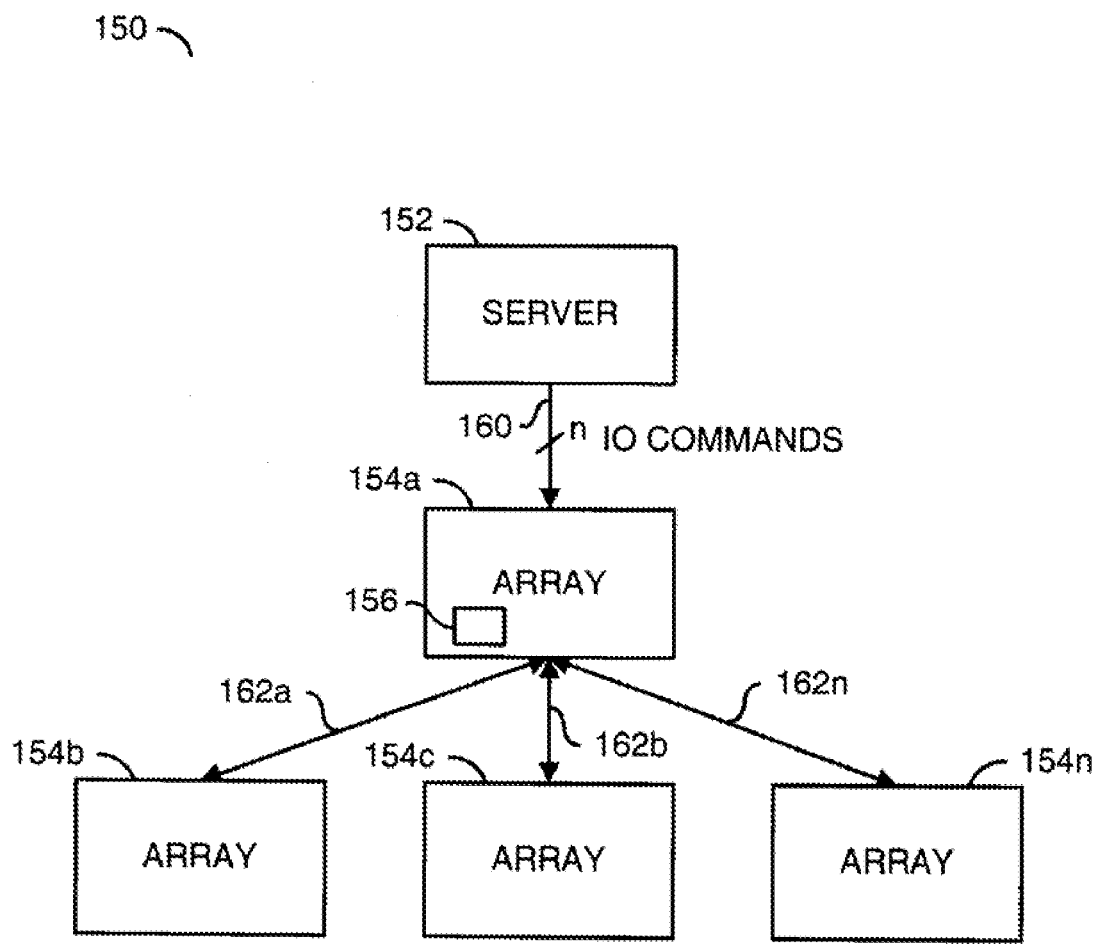
FIG. 6 is a block diagram of another embodiment of the present invention.

Referring to FIG. 6, a block diagram of a system 150 is shown in accordance with a preferred embodiment of the present invention. The system 150 generally comprises a module 152, a set of modules 154a-154n, and a module 156. The module 152 may be implemented as a server. The modules 154a-154n may be implemented as storage arrays. In one example, the module 154a may be implemented as a primary array. The modules 154b-154n may be implemented as one or more remote arrays. The module 156 may be implemented as an IO queue (e.g., an inter-array IO queue). The server 152 may be connected to the primary storage array 154a through a connection 160. The primary array 154a may be connected to the remote arrays 154b-154n through a number of connections 162a-162n. The particular number of arrays 154a-154n may be varied (e.g., increased and/or decreased) to meet the design criteria of a particular implementation. The connection 160 and/or the connections 162a-162n may be network connections, such as a fiber channel connection or other type of network connection. The connection 160 and/or the connections 162a-162n may each be implemented as one or more network segments.

When the primary array 154a first establishes a connection with the remote storage arrays 154b-154n, the primary array 154a may query the remote storage arrays 154b-154n for the size of a baseline IO queue. The remote storage arrays 154b-154n may inform the primary storage array 154a if a capability of the remote storage arrays 154b-154n changes (e.g., changes via a multiplier). For example, the performance capabilities of each of the remote storage arrays 154b-154n may be checked and/or reported at a predetermined interval, after a specific event (e.g., when operating on battery power, after a clean up process, etc.), when the total number of IO requests reaches a certain level, etc.

The functions performed by the diagrams of FIGS. 2-5 may be implemented using one or more of a conventional general purpose processor, digital computer, microprocessor, microcontroller, RISC (reduced instruction set computer) processor, CISC (complex instruction set computer) processor, SMID (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method for handling input/output (IO) requests between storage arrays, comprising:
   defining a queue size for a remote storage array based on a performance capability of the remote storage array;
   generating a multiplier for the remote storage array in response to an event that reduces a performance of the remote storage array;
   adjusting the queue size by the multiplier and informing a primary storage array when the queue size is adjusted; and
   executing IO requests between the remote storage array and the primary storage array based on the adjusted queue size.

2. The method according to claim 1, further comprising:
   repeating the generating, adjusting, and executing after a predetermined time.

3. The method according to claim 1, in which the primary storage array is connected to the remote storage array through a network connection.

4. The method according to claim 1, in which the primary storage array comprises an inter-array queue corresponding to a queue of the remote storage array.

5. The method according to claim 1, in which a queue at the remote storage array comprises an inter-array IO queue.

6. The method according to claim 1, in which the IO requests between the remote storage array and the primary storage array comprise inter-array IO requests.

7. The method according to claim 1, in which the event that reduces performance comprises running a background process at the remote storage array.

8. The method according to claim 7 in which the background process comprises a data scrubbing process.

9. The method according to claim 1, in which the multiplier is based on an amount of total processing power left at the remote storage array after factoring in one or more background processes running at the remote storage array.

10. A method for handling input/output (IO) requests between a primary storage array and a remote storage array, the method comprising:
    maintaining an IO queue at the primary storage array, the IO queue including an inter-array IO queue corresponding to the remote storage array;
    receiving an indication from the remote storage array that a performance of the remote storage array has changed;
    adjusting a size of the inter-array IO queue in response to the indication; and
    executing IO requests between the primary storage array and the remote storage array based on an adjusted size of the inter-array IO queue.

11. The method of claim 10, in which adjusting a size of the inter-array IO queue comprises:
    receiving a queue multiplier from the remote storage array; and
    applying the queue multiplier to the inter-array IO queue.

12. The method of claim 11, in which the queue multiplier is based on an amount of total processing power left at the remote storage array after factoring in one or more background processes running at the remote storage array.

13. The method of claim 10, in which adjusting a size of the inter-array IO queue comprises applying a multiplier to the inter-array IO queue, further in which the queue multiplier is initially set to a value of one.

14. The method of claim 13, further comprising:
    increasing or decreasing the multiplier based on resources being used by the remote storage array.

15. The method of claim 10, further comprising:
    delaying sending IO requests to the remote storage array when the inter-array IO queue is full.

16. The method of claim 10, in which the receiving an indication is in response to querying the remote storage array for a size of a queue at the remote storage array.

17. A computer program product having a non-transitory computer readable medium tangibly recording computer program logic for handling input/output (IO) requests between a primary storage array and a remote storage array, the computer program product comprising:
    code to maintain an IO queue at the primary storage array, the IO queue including an inter-array IO queue corresponding to the remote storage array;
    code to receive an indication from the remote storage array that a performance of the remote storage array has changed;
    code to adjust a size of the inter-array IO queue in response to the indication; and code to execute IO requests between the primary storage array and the remote storage array based on an adjusted size of the inter-array IO queue.

18. The computer program product of claim 17, in which the code to adjust a size of the inter-array IO queue comprises:

code to receive a queue multiplier from the remote storage array; and code to apply the queue multiplier to the inter-array IO queue.

19. The computer program product of claim 18, in which the queue multiplier is based on an amount of total processing power left at the remote storage array after factoring in one or more background processes running at the remote storage array.

20. The compute program product of claim 17 further comprising:

code to delay sending IO requests to the remote storage array when the inter-array IO queue is full.

* * * * *